Patented Apr. 8, 1930

1,753,746

UNITED STATES PATENT OFFICE

ARCHIE R. KEMP, OF EAST ORANGE, NEW JERSEY, ASSIGNOR TO WESTERN ELECTRIC COMPANY, INCORPORATED, OF NEW YORK, N. Y., A CORPORATION OF NEW YORK

PLASTIC COMPOSITION

No Drawing.  Application filed December 3, 1923.  Serial No. 678,207.

This invention relates to the art of producing plastic compositions, particularly those in which a filling material is used.

In the manufacture of plastic compositions it is common practice to use a filling material in order to give to the composition the desired properties. This filling material may be present in varying quantities and also may be used in a variety of forms. Where one of the objects is more particularly to cheapen the composition, a large amount of filler is often employed even up to 80% of the composition in some cases. This filling material may be in very finely divided form or may be used in comparatively large particles.

It is the object of the present invention to improve the properties of plastic compositions by so treating the filler to be incorporated therein that it becomes more intimately associated with the plastic employed, in such a way as to secure a minimum porosity and a maximum cohesion.

More specifically, the object of the invention is to provide a process for driving out occluded gases, volatilizing or oxidizing impurities on the surface of the particles of filling material and to forming a film on such surfaces which does not readily readsorb gas.

The following description will be restricted to the cases in which gums such as rubber, balata, gutta-percha and the like are employed, with the understanding that generic aspects of the invention may be comprehended in the terms of the appended claims.

The incorporation of fillers with rubber is always attended by diminution of distensibility which if carrier too far results in a decrease of mechanical strength and, in the case of electrical insulation, in a diminished dielectric strength and moisture resistance. Above certain limits the weakening of the article in these particulars is directly proportional to the additional amount of filler used. This is due to the fact that such rubber compositions consist of particles of filler more or less thoroughly cemented together by a magma of rubber. Mechanically or electrically as well as in the property of water absorption the point of greatest weakness is not in the substance of the rubber or of the filler, but in the joint bond or union between the two. This weakness is inherent in such compositions whether of low or high filler content but is most serious in the latter case since the number of such joints per unit volume of material is increased.

When the plastic composition is to be used for insulating electrical conductors, particularly those employed in submarine telephone and telegraph cables, it is desirable that the filler employed have a low inductive capacity in addition to the other desirable properties mentioned above. A mineral filler such as silica which has been fused and then ground to the desired fineness has been found to be particularly suitable for this work.

It has been found that if this filler is subjected initially to a degasifying treatment such as heating in order to remove the adsorbed gases therefrom a much stronger bond is secured between the filler particles and the surrounding magma of rubber. Drying the filler by warming at slightly elevated temperatures has been resorted to heretofore for the purpose of removing the moisture but such drying operation has had but little effect upon combined moisture and truly adsorbed gases or vapors. It has been shown (see I. Langmuir, Journal American Chemical Society 40, 1918, page 1361) that adsorbed gases or vapors upon the surface of mineral matters like glass or mica are in a relatively firm condition and are unaffected by ordinary drying temperatures. Such gas films persist upon the filler particles to a degree even after being incorporated with the rubber magma, and being interposed between the surface of the filler particles and the rubber interfere with adhesion. In a somewhat analogous manner a film of oil paint will not adhere to a wet surface.

In accordance with the present invention the filler which is preferably an inorganic filler such as fused silica is first ground or otherwise worked to a finely divided state and then heated to a temperature of approximately 950° C. at which temperature it attains full redness. It is maintained at this temperature for several hours and is then allowed to cool in air without taking any precautions to control the kind or quantity of gas adsorbed. The filler is then compounded with the rubber and vulcanized in the usual manner. If the temperature is raised appreciably above 1000° C. the filler particles tend to sinter together necessitating regrinding the mass and thus exposing fresh unheated surfaces. If the temperature is lowered appreciably less beneficial results are obtained and the temperature therefore is preferably not allowed to drop blow 900° C. The time of heating is regulated somewhat by the temperature maintained and the fineness of the filler particles. When the particles are of a fineness to pass through a 200-mesh sieve a heating period under commercial conditions of from two to five hours has been found to be preferable although additional heating may be of slight additional benefit. For the most satisfactory results the heating period should not be less than one hour.

It has been demonstrated that the process of heating fused silica to approximately 950° C. results in a product which has a gas film of only about one-half the volume per unit area of that of unheated silica, thus partly accounting for the greatly improved results obtained when heating the filler to this temperature. It is believed that when the fused silica is heated under these conditions the surfaces of the fused silica particles are changed from an amorphous to a crystalline structure by the forming of a thin film of tridymite or crystabolite which does not readsorb the original gas film. Furthermore, the heating of the filler particles to this high temperature brings about improved results due to the volatilization, oxidation or fusion of solid or liquid impurities on the surface of the particles.

The product resulting from this method of treating the filler particles possesses properties which are highly desirable either from a mechanical or an electrical standpoint. Its water resistant properties are also enhanced in that the porosity is reduced to a minimum. It is not always desirable to use the filler in a finely divided state and if the filler is employed in comparatively large particles the time of heating may be varied somewhat depending upon the physical characteristics of the filler.

Rubber treated in accordance with this process has been found to be particularly useful as the insulating material for submarine cables.

What is claimed is:

1. A plastic composition containing a fused silica filler, the surfaces of the particles of such filler being covered with a crystalline film.

2. A filler of fused silica in a finely divided amorphous state having the surfaces of individual particles in a crystalline state.

3. A filler consisting of finely divided particles of fused silica from which occluded gases have been driven off and the surfaces of individual particles treated to prevent the readsorption of a gas film when exposed to a gas.

4. A step in the manufacture of a plastic composition containing a silica filler, which step consists in heating said filler in a finely divided state to full redness and without sintering.

5. A step in the manufacture of a plastic composition containing a silica filler, which step consists in subjecting said filler to a temperature of 900° to 1000° C. and maintaining it at such temperature for a short period.

6. A step in the manufacture of a plastic composition containing a silica filler, which step consists in subjecting said filler to a temperature of approximately 950° C. and maintaining it at this temperature for a period of not less than one hour.

7. In the manufacture of plastic compositions which contain fused silica in a finely divided state as a filler, the step of removing from the filling material adsorbed and occluded gases followed by the step of forming a thin film of crystalline silica upon the surface of individual particles of the filler.

8. In the manufacture of plastic compositions which contain fused silica in a finely divided state as a filler, the step of removing from the filling material adsorbed and occluded gases followed by the step of forming a thin film of tridymite upon the surface of individual particles of the filler.

9. The method of compounding rubber insulating material which is highly resistant to water penetration and stable in its electrical characteristics, which method comprises the step of heating the fused silica filling material to redness to drive off gases which would prevent intimate and permanent association of the filling material with the rubber, and forming a thin film of crystalline silica upon the surface of individual particles of filler, whereby readsorption of the gases driven off is prevented.

In witness whereof, I hereunto subscribe my name this 30th day of November, A. D. 1923.

ARCHIE R. KEMP.